United States Patent [19]

Dean

[11] Patent Number: 4,753,987

[45] Date of Patent: Jun. 28, 1988

[54] CARBONAMIDE MODIFIED THERMOPLASTIC ELASTOMER-POLYOXAZOLINE MOLDING COMPOSITIONS

[75] Inventor: Barry D. Dean, Broomall, Pa.

[73] Assignee: ARCO Chemical Company, Newtown Square, Pa.

[21] Appl. No.: 870,268

[22] Filed: Jun. 3, 1986

[51] Int. Cl.$^4$ .................... C08L 53/02; C08L 79/00
[52] U.S. Cl. .................... 525/66; 524/504; 524/505; 525/92; 525/186
[58] Field of Search ............ 525/66, 92, 186, 282, 525/292

[56] References Cited

U.S. PATENT DOCUMENTS

| | | | |
|---|---|---|---|
| 4,429,076 | 1/1984 | Saito et al. | 525/66 |
| 4,532,187 | 7/1985 | Hoenig et al. | 525/186 |
| 4,547,530 | 10/1985 | McCreedy et al. | 525/66 |
| 4,578,429 | 3/1986 | Gergen et al. | 525/296 |
| 4,699,941 | 10/1987 | Salerno | 525/92 |

Primary Examiner—Wilbert J. Briggs, Sr.
Attorney, Agent, or Firm—Dennis M. Kozak

[57] ABSTRACT

Moldable compositions of a polyoxazoline and a hydrogenated elastomeric block copolymer grafted with ethylenically unsaturated carbonamide are disclosed which have good physical properties and chemical resistance.

16 Claims, No Drawings

CARBONAMIDE MODIFIED THERMOPLASTIC ELASTOMER-POLYOXAZOLINE MOLDING COMPOSITIONS

This invention relates to novel thermoplastic molding compositions based on blends of an ethylenically unsaturated carbonamide modified thermoplastic elastomer and a polyoxazoline.

Blends of partially hydrogenated elastomeric block copolymers with various thermoplastic polymers are taught in U.S. Pat. Nos. 4,101,605 and 4,119,607.

It has been found that modifying a hydrogenated elastomeric block copolymer with an ethylenically unsaturate carbonamide and blending the resulting carbonamide modified copolymer with polyoxazoline results in a composition having enhanced physical properties and improved chemical resistance as compared to either the base hydrogenated elastomer block copolymer or the carbonamide modified copolymer.

According to this invention, there is provided a moldable composition comprising (a) at least one polyoxazoline selected from the group consisting of oxazoline homopolymer, poly(2-substituted oxazoline) homopolymers and partially hydrolyzed oxazoline homopolymers, and (b) at least one hydrogenated elastomeric block copolymer grafted with ethylenically unsaturated carbonamide.

Also according to this invention, there is provided a method of producing a molded composition comprising the steps of (1) forming a blend comprising (a) at least one polyoxazoline selected from the group consisting of oxazoline homopolymer, poly(2-substituted oxazoline) homopolymers and partially hydrolyzed oxazoline homopolymers, and (b) at least one hydrogenated elastomeric block copolymer grafted with ethylenically unsaturated carbonamide, and (2) molding the resulting composition.

To produce the hydrogenated elastomeric block copolymer grafted with ethylenically unsaturated carbonamide (hereinafter sometimes referred to as "grafted thermoplastic elastomer") any suitable hydrogenated elastomeric block copolymer (hereinafter sometimes referred to as the "block copolymer") having at least one substantially completely hydrogenated diene polymer mid block (B) and at least two monoalkenyl arene polymer end blocks (A) can be employed. The grafted thermoplastic elastomer will contain from about 99.5 to about 89.5 weight percent of hydrogenate elastomeric block copolymer based on the total weight of the block copolymer and the carbonamide.

The block copolymer can either be a linear block copolymer represented by the structure $A-(B-A)_n$, wherein n represents an integer of from 1 to 5; or a radial block copolymer represented by the structure $B-(A)_x$, wherein x represents an integer of from 3 to 7, such that the copolymer has from 3 to 7 arms.

Suitable for use in the practice of this invention are the block copolymers taught in U.S. Pat. Nos. 3,595,942 and 4,377,647, the teachings of which are incorporated herein by reference thereto.

One particularly suitable series of block copolymers is commercially available from Shell Chemical Company under the trademark Kraton ®. Kraton G thermoplastic rubbers are hydrogenated styrene-butadiene-styrene triblock copolymers having number average molecular weights as determined by gel permeation chromatography (polystyrene standards) of from 85,000 to 300,000 and a molecular weight distribution (Mw/Mn) of from 1.05 to 1.7. The butadiene mid blocks of the Kraton G thermoplastic rubbers are at least 95% hydrogenated. Kraton G thermoplastic rubbers (TPR) particularly suitable for use include the hydrogenated styrene-butadiene-styrene triblock copolymers designated 1650, 1651, and 1652.

Kraton G1650 TPR has a styrene/rubber ratio of 28/72.

Kraton G1651 TPR has a styrene/rubber ratio of 33/67.

Kraton G1652 TPR has a styrene/rubber ratio of 29/71.

Any suitable ethylenically unsaturated carbonamide monomer having at least one hydrogen on the carbonamide nitrogen can be employed to produce the grafted thermoplastic elastomers usable in the practice of this invention. The grafted thermoplastic elastomer will contain from about 0.5 to about 10.5 weight percent carbonamide based on the total weight of the block copolymer and the carbonamide.

Suitable ethylenically unsaturated carbonamide monomers include acrylamide, methacrylamide, Δ-4-tetrahydrophthalamide, and maleimide as well as any other carbonamide monomer having ethylenic unsaturation and at least one hydrogen chemically bonded to the carbonamide nitrogen. Maleimide is the preferred carbonamide monomer.

The ethylenically unsaturated carbonamide can be chemically grafted onto the block copolymer elastomer using any suitable method of generating free radicals including introducing a free radical initiator into the composition or through thermomechanical free radical generation or irradiation. Suitable free radical initiators include peroxide initiators such as benzoyl peroxide, t-butyl perbenzoate, and di-t-butyl peroxide and azo initiators such as azobisisobutyronitrile. If used, the free radical initiator will be employed in an amount of from about 0.00001 to about 0.001 weight percent based on the total weight of the block copolymer and the carbonamide.

Any suitable oxazoline polymer can be employed in the practice of this invention. Typically, the number average molecular weight of the polyoxazoline polymer should be between about 40,000 to about 700,000 as determined by gel permeation chromatography using polystyrene standards.

Suitable oxazoline polymers include oxazoline homopolymer, poly(2-substituted oxazoline) homopolymer, or partially hydrolyzed oxazoline polymers.

Particularly suitable for use in this invention are poly(2-ethyl oxazoline) homopolymers. The preparation of poly(2-ethyl oxazoline) homopolymers is taught in U.S. Pat. No. 3,640,909 and is incorporated herein by reference. One suitable poly(2-ethyl oxazoline) homopolymer is available from Dow Chemical U.S.A., an operating unit of the Dow Chemical Company, under the designation Poly(ethyloxazoline) developmental polymer XAS-10874.

To produce a moldable composition of this invention, any suitable method of blending the polyoxazoline with the grafted thermoplastic elastomer can be used, e.g., a Brabender mixing apparatus. The moldable composition will preferably contain from about 1 to about 15 parts by weight of oxazoline polymer per each 100 parts by weight of grafted thermoplastic elastomer.

The moldable compositions of this invention can also include other ingredients such as extenders, processing aids, pigments, mold release agents and the like, for their conventionally employed purpose. Also, reinforcing fillers in amounts sufficient to impart reinforcement can be used, such as titanium dioxide, potassium titanate and titanate whiskers, glass flakes and chopped glass fibers.

The following examples serve to demonstrate the invention.

EXAMPLE 1

This example demonstrates the preparation of a hydrogenated elastomeric block copolymer grafted with ethylenically unsaturated carbonamide.

A Brabender mixing apparatus was charged with about 54 grams of Kraton G1650 TPR and about 1.45 grams of maleimide monomer at 135° C. Tertiary-butylperbenzoate free radical initiator (0.01 g) was added over a five minute period with the mixing rotors turning at about 63 rpm. The grafted thermoplastic elastomer (i.e. Kraton G1650 TPR grafted with maleimide was removed and analyzed by differential scanning calorimetry, gel permeation chromatography and elemental nitrogen analysis. The analyses results are shown below.

| Property | Hydrogenated Elastomeric Block Copolymer* | Hydrogenated Elastomeric Block Copolymer* Grafted with Ethylenically Unsaturated Carbonamide |
| --- | --- | --- |
| Tg (°C.) | −48, 71 | −42, 79 |
| Mn | 101,400 | 119,400 |
| Mw/Mn | 1.26 | 1.28 |
| % N | <0.01 | 0.38 |
| % Maleimide | 0 | 2.6 |

*Kraton G1650 TPR

EXAMPLE 2

This example demonstrates the preparation of a hydrogenated elastomeric block copolymer grafted with ethylenically unsaturated carbonamide.

A Brabender mixing apparatus was charged with about 54 grams of Kraton G1650 TPR and about 3.2 grams of maleimide monomer at 135° C. Tertiary-butylperbenzoate free radical initiator (0.01 g) was added over a five minute period with the mixing rotors turning at about 63 rpm. The grafted thermoplastic elastomer was removed and analyzed by differential scanning calorimetry, gel permeation chromatography and elemental nitrogen analysis. The analyses results are shown below.

| Property | Hydrogenated Elastomeric Block Copolymer* | Hydrogenated Elastomeric Block Copolymer* Grafted with Ethylenically Unsaturated Carbonamide |
| --- | --- | --- |
| Tg (°C.) | −48, 71 | −41, 82 |
| Mn | 101,400 | 122,100 |
| Mw/Mn | 1.26 | 1.29 |
| % N | <0.01 | 0.8 |
| % Maleimide | 0 | 5.6 |

*Kraton G1650 TPR

EXAMPLE 3

This example demonstrates the preparation of a moldable composition of this invention.

About 10 parts by weight of poly(2-ethyloxazoline) [Poly(ethyloxazoline) developmental polymer XAS-10874, Dow Chemical U.S.A.] were incorporated by blending into about 100 parts by weight of the grafted thermoplastic elastomer produced according to the procedure of Example 1. The blend was prepared in a Brabender mixer set at 63 rpm by mixing for about 5 minutes at 200° C.

The resulting blend was recovered as a moldable composition of the invention and samples were compression molded. The molded samples were analyzed and compared to molded control samples of Kraton G1650 TPR and Kraton G1650 TPR grafted with carbonamide. The analyses results are set forth in Table I below.

TABLE I

| COMPOSITION OF EXAMPLE NO: | | Block Copolymer* Control | Block Copolymer* Grafted with Carbonamide Example 1 | Block Copolymer* Grafted with Ethylenically Unsaturated Carbonamide and Polyoxazoline Example 3 |
| --- | --- | --- | --- | --- |
| Property | Test Method | | | |
| Tg (°C.) | Differential Scanning Calorimetry | −48, 71 | −42, 79 | −45, 96 |
| Tg (°C.) | Dynamic Mechanical Analysis | −39, 76 | −32, 82 | −34, 99 |
| Tensile Strength (psi) | ASTM-D-638 | 3860 | 4600 | 5980 |
| Elongation (%, break) | ASTM-D-638 | 521 | 499 | 519 |
| Compression Set (%) | ASTM-D-395 | | | |
| at 25° C. | | 24 | 27 | 21 |
| at 70° C. | | 67 | 27 | 21 |
| Energy to break (in-lbs/in$^3$) | ASTM-D-412 | 4,750 | 6,680 | 10,180 |
| Weight Gain (%) 72 hrs., 25° C. | ASTM Oil #1 | 22 | 20 | 13 |
| | ASTM Oil #3 | 243 | 120 | 79 |
| Melt Viscosity (poise at 100 sec$^{-1}$, 232° C.) | Instron Rheology | 38,390 | 30,600 | 19,140 |

*Kraton G1650 TPR

EXAMPLE 4

This example demonstrates the preparation of a moldable composition of this invention.

About 10 parts by weight of poly(2-ethyloxazoline) [Poly(ethyloxazoline) developmental polymer XAS-10874, Dow Chemical U.S.A.] were incorporated by blending into about 100 parts by weight of the grafted thermoplastic elastomer produced according to the procedure of Example 2. The blend was prepared in a Brabender mixer set at 63 rpm by mixing for about 5 minutes at 200° C.

The resulting blend was recovered as a moldable composition of the invention and samples were compression molded. The molded samples were analyzed and compared to molded control samples of Kraton G1650 TPR and Kraton G1650 TPR grafted with carbonamide according to the procedure of Example 2. The analyses results are set forth in Table II below.

TABLE II

| COMPOSITION OF EXAMPLE NO: | | Block Copolymer* Control | Block Copolymer* Grafted with Carbonamide Example 3 | Block Copolymer* Grafted with Ethylenically Unsaturated Carbonamide and Polyoxazoline Example 4 |
|---|---|---|---|---|
| Property | Test Method | | | |
| Tg (°C.) | Differential Scanning Calorimetry | −48, 71 | 42, 82 | −44,101 |
| Tg (°C.) | Dynamic Mechanical Analysis | −39, 76 | −31, 86 | −36,107 |
| Tensile Strength (psi) | ASTM-D-638 | 3860 | 4970 | 6180 |
| Elongation (%) (% break)) | ASTM-D-638 | 521 | 520 | 534 |
| Compression Set (%) | ASTM-D-395 | | | |
| at 25° C. | | 24 | 23 | 18 |
| at 70° C. | | 67 | 21 | 13 |
| Energy to break (in-lbs/in$^3$) | ASTM-D-412 | 4,750 | 7,260 | 11,870 |
| Weight Gain (%) 72 hrs., 25° C. | ASTM Oil #1 ASTM Oil #2 | 22 243 | 18 106 | 9 51 |
| Melt Viscosity (poise at 100 sec$^{-1}$, 232° C.) | Instron Rheology | 38,390 | 37,640 | 21,450 |

*Kraton G1650 TPR

It will be evident from the foregoing that various modifications can be made to this invention. Such, however are considered as being within the scope of the invention.

What is claimed is:

1. A moldable composition comprising (a) at least one polyoxazoline selected from the group consisting of oxazoline homopolymer, poly(2-substituted oxazoline) homopolymers and partially hydrolyzed oxazoline homopolymers, and (b) at least one hydrogenated elastomeric block copolymer elastomeric block copolymer grafted with at least one ethylenically unsaturated carbonamide monomer, wherein component (a) is employed in an amount of from about 1 to about 15 parts by weight per each 100 parts by weight of component (b).

2. The moldable composition of claim 1 in which said hydrogenated elastomeric block copolymer which is grafted has at least one substantially completely hydrogenated diene polymer mid block and at least two monoalkenyl arene polymer end blocks.

3. The composition of claim 2 in which said hydrogenated elastomeric block copolymer is a linear block copolymer represented by the structure A-(-B—A-)-$_n$, wherein A represents the end block, B represents the mid block, and n represents an integer of from 1 to 5.

4. The composition of claim 2 in which said hydrogenated elastomeric block copolymer is a radial block copolymer represented by the structure B-(-A)$_x$, wherein A represents the end block, B represents the mid block, and x represents an integer of from 3 to 7 such that the radial block copolymer has from 3 to 7 arms.

5. The composition of claim 3 in which said linear block copolymer is a hydrogenated styrene-butadiene-styrene triblock copolymer.

6. The composition of claim 1 in which said ethylenically unsaturated carbonamide has at least one hydrogen chemically bonded to the carbonamide nitrogen.

7. The composition of claim 1 in which said ethylenically unsaturated carbonamide monomer is acrylamide.

8. The composition of claim 1 in which said ethylenically unsaturated carbonamide monomer is methacrylamide.

9. The composition of claim 1 in which said ethylenically unsaturated carbonamide monomer is Δ-4-tetrahydrophthalamide.

10. The composition of claim 1 in which said ethylenically unsaturated carbonamide monomer is maleimide.

11. The composition of claim 1 in which said hydrogenated elastomeric block copolymer grafted with ethylenically unsaturated carbonamide monomer contains from about 0.5 to about 10.5 weight percent of the ethylenically unsaturated carbonamide monomer based on the total weight of the block copolymer and the carbonamide monomer.

12. The composition of claim 1 in which said hydrogenated elastomeric block copolymer grafted with ethylenically unsaturated carbonamide contains from about 99.5 to about 89.5 weight percent of the block copolymer based on the total weight of the block copolymer and the carbonamide monomer.

13. A method of producing a molded composition comprising the steps of (1) forming a blend comprising
   (a) at least one polyoxazoline selected from the group consisting of oxazoline homopolymer, poly(2-substituted oxazoline) homopolymers and partially hydrolyzed oxazoline homopolymers, and (b) at least one hydrogenated elastomeric block copolymer grafted with ethylenically unsaturated carbonamide wherein component (a) is employed in an amount of from about 1 to about 15 parts by weight per each 100 parts by weight of component (b) and
   (2) molding the resulting composition.

14. The method of claim 13 in which said blend is molded in contact with a reinforcing filler.

15. A molded article produced according to the method of claim 13.

16. A molded article produced according to the method of claim 14.

* * * * *